United States Patent [19]

Van der Stuyf

[11] Patent Number: 4,559,995

[45] Date of Patent: Dec. 24, 1985

[54] ASSEMBLY FOR COOLING AND DAMPENING VIBRATIONS OF A UNIT MOUNTED THEREIN

[75] Inventor: Allen F. Van der Stuyf, Columbus, Ind.

[73] Assignee: Cummins Engine Company, Inc., Columbus, Ind.

[21] Appl. No.: 370,599

[22] Filed: Apr. 21, 1982

[51] Int. Cl.⁴ .................................................. F02B 77/00
[52] U.S. Cl. ........................................ 165/47; 165/41; 123/198 E
[58] Field of Search ............................ 165/47, 41, 51; 123/41.31, 47, 198 E, 198 C

[56] References Cited

U.S. PATENT DOCUMENTS

| | | | |
|---|---|---|---|
| 2,798,364 | 7/1957 | Morrison | 165/47 |
| 3,183,022 | 5/1965 | Sayag | 92/34 |
| 3,286,703 | 11/1966 | Rawles | 165/51 |
| 3,628,601 | 12/1971 | Snaper | 165/47 |
| 3,996,914 | 12/1976 | Crall | 123/198 E |
| 4,006,724 | 2/1977 | Carter | 123/198 E |
| 4,134,370 | 1/1979 | Iwahashi | 123/198 E |

Primary Examiner—William R. Cline
Assistant Examiner—John J. McGlew, Jr.
Attorney, Agent, or Firm—Neuman, Williams, Anderson & Olson

[57] ABSTRACT

An assembly is provided for use in cooling and dampening vibrations of an electronic fuel pump controller which is mounted on the body of a fuel pump, the latter being utilized in an internal combustion engine. The assembly comprises a housing having marginal portions secured to the exterior of the pump body so as to conceal the controller within the housing. A plurality of relatively spaced spacer means are disposed within the housing interior and resiliently retain a non-porous enclosure of the controller in a predetermined spaced relation with the housing interior surfaces. Ports are formed in the housing which communicate with the interior thereof. Gasket means of a resilient non-porous material is provided having an inner section sealingly secured in encompassing relation with a portion of the controller enclosure. The gasket means also includes an outer section outwardly spaced from the inner section and a continuous resilient mediate section encircling the enclosure portion and interconnecting the inner and outer sections. The outer section is sealingly secured in sandwiched relation between the housing marginal portions and the fuel pump body. The mediate section of the gasket means, the spacer means, and the housing interior surfaces coact with a substantial area of the exterior of the controller enclosure to form a chamber through which a coolant continuously circulates.

7 Claims, 2 Drawing Figures

U.S. Patent   Dec. 24, 1985   4,559,995

ASSEMBLY FOR COOLING AND DAMPENING VIBRATIONS OF A UNIT MOUNTED THEREIN

BACKGROUND OF THE INVENTION

In internal combustion engines utilizing electronic components, such as an electronic fuel pump controller, the components are deleteriously affected when exposed to environmental extremes in temperature and vibrations. By reason of this fact, it has heretofore normally been necessary to mount such components in somewhat remote locations on the engine, notwithstanding that from a space limitation consideration it would be more desirable to mount such components directly on the exterior of the fuel pump body. Furthermore, because of the size and complexity of prior assemblies of this general type, attachment thereof directly to the pump body could not be readily achieved without requiring substantial modifications being made to the engine and/or fuel pump body. Prior assemblies because of inherent design characteristics oftentimes were awkward and difficult to mount; were ineffective in cooling and dampening vibrations of the controller components; and required an inordinate amount of maintenance and servicing.

SUMMARY OF THE INVENTION

Thus, it is an object of the invention to provide an assembly of the type described which avoids the shortcomings associated with prior structures.

It is a further object to provide a compact assembly which may be readily mounted on the exterior of the fuel pump body without deleteriously affecting sensitive electronic components concealed within the assembly.

It is a still further object to provide an assembly which eliminates the need for external wiring harnesses and/or an inordinate amount of flexible tubing for the coolant.

Further and additional objects will appear from the description, accompanying drawing and appended claims.

In accordance with one embodiment of the invention, an improved assembly is provided which provides the necessary cooling and vibration dampening for a thermal and vibration sensitive unit enclosed within the assembly. The assembly includes a housing having marginal portions thereof mounted on the exterior of a heat-generating and vibrating supporting surface. Disposed within the housing interior are a plurality of spacers which resiliently retain the unit exterior in a predetermined spaced relation with respect to the interior surface of the housing. The housing is provided with a pair of relatively spaced ports which communicate with the housing interior. A gasket means of resilient nonporous material is provided which includes an inner section, an outer section, and a continuous mediate section. The inner section is sealingly bonded, or otherwise secured in encompassing relation to an exterior portion of the unit concealed within the housing. The outer section is securely sandwiched between the housing marginal portions and the supporting surface. The continuous mediate section resiliently interconnects the inner and outer sections. The gasket means mediate section, the housing interior surfaces, and the spacers coact with one another and with a substantial area of the unit exterior to form a chamber through which a coolant circulates.

DESCRIPTION

For a more complete understanding of the invention, reference should be made to the drawing wherein.

Figure 1:
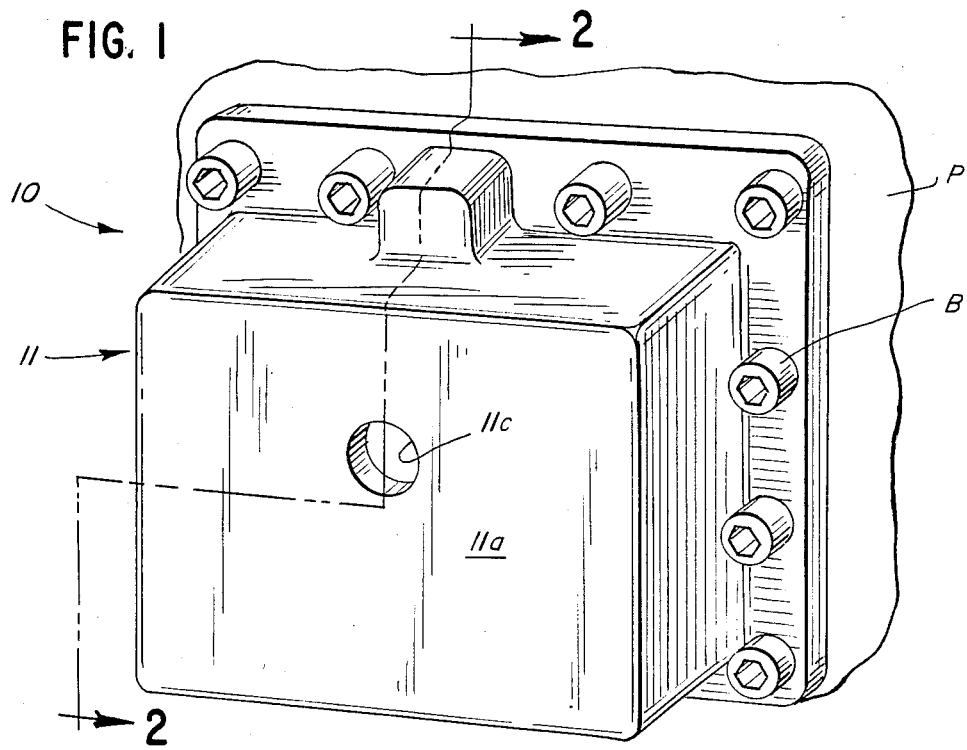
FIG. 1 is a fragmentary perspective view of one form of the improved assembly shown mounted on the exterior of a fuel pump body.

Referring now to the drawing, one form of an improved assembly 10 is shown which is adapted to be used on an internal combustion engine wherein the latter embodies an electronic fuel pump controller unit U. Such a unit is adversely affected when exposed to environmental extremes in temperature and vibration. Because of space limitations normally encountered in internal combustion (diesel) engines utilized in heavy duty trucks and the like, it is highly desirable, if possible, to mount such a controller unit U on the exterior of the body of the fuel pump for the engine. Such a location of the unit would normally subject the latter to severe temperature extremes and destructive engine vibrations. It is the function of the improved assembly 10 to effect proper cooling and dampening of the vibrations of the unit and thus, significantly enhance the useful life of the various sensitive components utilized in such controller units. Heretofore, because of the location of such a unit on the engine, an external wiring harness and a large amount of flexible tubing were oftentimes required which complicated and increased the cost of installing such a unit. With assembly 10 these problems are readily avoided.

As shown, assembly 10 includes a housing 11 formed of a suitable metal or plastic material. The housing has a convexo-concave central portion 11a which is substantially delimited by an outwardly offset marginal portion 11b. As seen in FIG. 1 the marginal portion is provided with a plurality of openings which are adapted to accommodate suitable attaching bolts B. The bolts are threaded into corresponding threaded openings, not shown, formed in the exterior surface of the pump body P.

The central portion 11a of the housing is provided with an opening or port 11c which may be connected by suitable piping K to the fuel tank, not shown, of the engine. The location of the opening 11c in the housing central portion may vary from that shown and will depend upon the accessibility of the housing and fuel tank.

Figure 2:
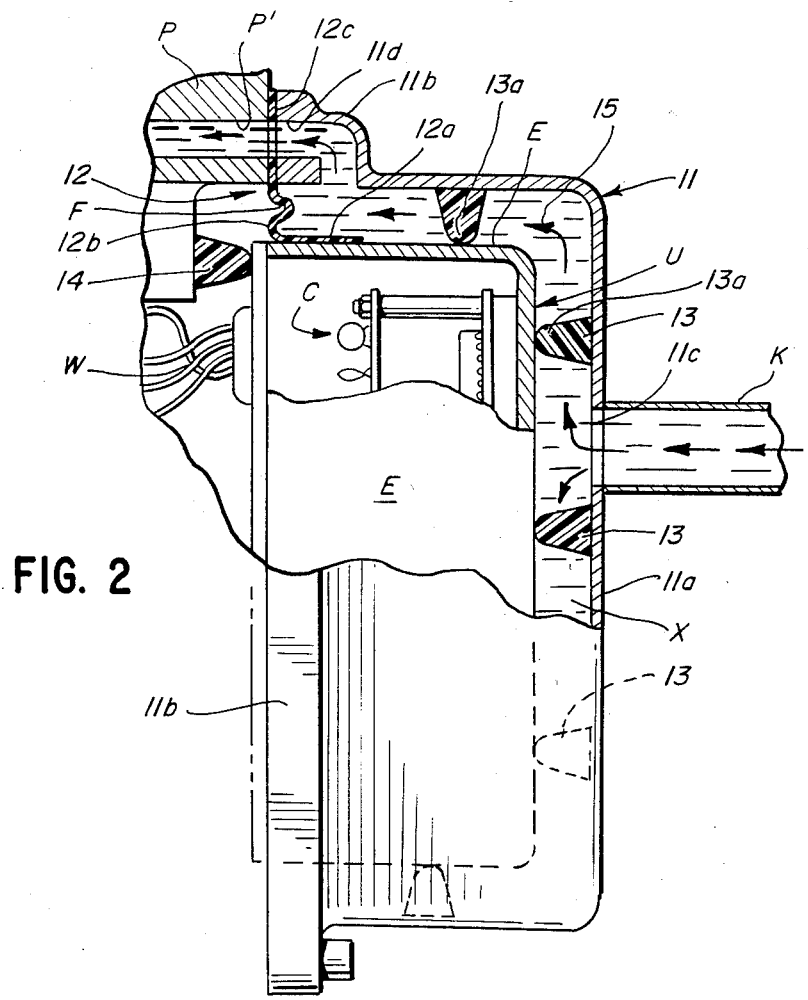
FIG. 2 is an enlarged fragmentary sectional view taken along line 2—2 of FIG. 1.

Formed in the offset marginal portion 11b of the housing is an opening 11d which is aligned with a passage P' formed in the pump body P, see FIG. 2. Passage P' normally communicates with the intake side of the fuel pump, not shown.

Disposed within the interior of housing central portion 11a is the controller unit U. The sensitive electronic components C (e.g. electronic fuel pump controller) of the unit are normally disposed within an enclosure E which is formed of a suitable metal or plastic material. The configuration of the housing central portion 11a is dependent in part at least on the configuration of the enclosure E and the location of the passage P' with respect thereto.

A one piece gasket 12 formed of a resilient elastomeric non-porous material (e.g. neoprene-VITON) is provided which includes an inner section 12a, a mediate section 12b, and an outer section 12c. Inner section 12a is in the form of a wide band which conforms to and encompasses a segment of the enclosure exterior and is bonded or otherwise suitably affixed thereto. The mediate section 12b is integral with and completely encircles inner section 12a. Mediate section 12b projects laterally outwardly from the inner section and is provided with a bellows-like fold F which surrounds in outwardly spaced relation the unit enclosure E. The outer section 12c is substantially planar and integral with the mediate section and projects laterally outwardly therefrom. The outer section is secured in sealingly sandwiched relation between the backside of housing marginal portion 11b and the pump body exterior P. Openings are formed in the gasket outer section which coincide with the opening 11d and the bolt holes formed in the marginal portion 11b.

By reason of the bellows-like fold F formed in the mediate section of the gasket 12, the unit enclosure E is resiliently suspended within the housing interior.

In order to maintain the unit U in proper spaced relation within the housing interior a plurality of relatively spaced fingerlike spacers 13 are provided which in the illustrated embodiment are secured to the housing interior surfaces. The spacers are formed of a suitable elastomeric material and project inwardly from the housing interior surface and have the distal ends 13a thereof contacting the unit enclosure. As noted in FIG. 2, a spacer 14 may be affixed to the pump body exterior which is overlaid by a portion of the unit enclosure. Spacer 14 resiliently engages the backside of the enclosure. As an alternative, the spacers 13 may be mounted on and project outwardly from the exterior of the unit enclosure E. In the latter arrangement, the distal ends of the spacers would engage the housing interior.

The central portion 11a of the housing 11, the mediate section 12b of the gasket and the spacers 13 coact with one another and with the exterior of the unit enclosure E to form a chamber X. Openings or ports 11c and 11d communicate with chamber X thereby enabling fuel or coolant to be continuously circulated through the chamber, as shown by the arrows 15 in FIG. 2, while the fuel pump is operating. The mediate section 12b, as aforementioned, is formed of a non-porous, vibration absorbing, preferably thermal insulative material and thus, prevents any leakage of the circulating fuel or coolant past the mediate section and into contact with the backside of the enclosure from which the necessary wiring W for the electronic components extends. Thus, no shielding of the wiring against the fuel or coolant is required. Furthermore, no harness for the wiring is required.

With the improved assembly the enclosure vibration can be reduced from about 10g to about 2g.

Thus, an improved assembly has been provided which is of simple, inexpensive and sturdy construction, and yet, is effective in cooling and dampening vibrations of sensitive electronic components and the like. The assembly can be easily installed directly on the exterior of a fuel pump body without deleteriously affecting the fuel pump or the sensitive components disposed within the assembly.

I claim:

1. An assembly for use in cooling and dampening vibrations of a unit when the latter is mounted on a heat-generating and vibrating supporting surface, said assembly comprising a housing having the interior portion for accommodating and concealing therein the unit, and external marginal portions projecting outwardly from the interior portion and being mountable on the supporting surface; relatively spaced resilient spacer means disposed within the housing interior portion and coacting with surfaces defining the housing interior portion and exterior surfaces of the unit for resiliently retaining the latter in a predetermined spaced relation with the surfaces defining the housing interior portion; relatively spaced ports formed in said housing and communicating with the interior portion thereof and through which a cooling medium is adapted to circulate; and a gasket means of resilient material, said gasket means including an inner section adapted to encompass and be sealingly secured to segments of the unit exterior surfaces disposed within the housing interior portion, an outer section disposed in outwardly spaced substantially encompassing relation with said inner section and adapted to be secured in substantially sandwiched sealing relation between the housing marginal portions and the supporting surface, and a continuous resilient non-porous mediate section interconnecting said inner and outer sections; said spacer means, housing interior surfaces, and said gasket mediate section coacting with a substantial area of the unit exterior to form a chamber for the circulating cooling medium.

2. The assembly of claim 1 wherein the spacer means and at least the gasket means mediate section are of resilient vibration absorbing material and the spacer means are mounted on and project inwardly from the surfaces defining the housing interior portion and resiliently engage exterior surface portions of the unit.

3. The assembly of claim 1 wherein the gasket means mediate section is adapted to separate the cooling medium chamber from a second chamber formed by the supporting surface and the remaining area of the unit exterior.

4. The assembly of claim 2 wherein the housing interior surface and the exterior surface of the unit are formed of substantially rigid material.

5. The assembly of claim 1 wherein the gasket inner section is substantially bonded to and conforms to exterior surface portions of the unit.

6. The assembly of claim 1 wherein at least one of the housing ports communicates with an inlet side of a fuel pump associated with a controller forming a component of the unit.

7. The assembly of claim 1 wherein the mediate section of the gasket means is provided with a bellows-like fold which is disposed in outwardly spaced substantially concentric relation with the inner section.

* * * * *